(12) United States Patent
Iiduka

(10) Patent No.: US 7,307,226 B2
(45) Date of Patent: Dec. 11, 2007

(54) ELECTRONIC BALANCE HAVING A VIBRATION REDUCING MECHANISM

(75) Inventor: Atushi Iiduka, Toyonaka (JP)

(73) Assignee: Shimadzu Corporation, Kyoto-shi (JP)

( * ) Notice: Subject to any disclaimer, the term of this patent is extended or adjusted under 35 U.S.C. 154(b) by 169 days.

(21) Appl. No.: 11/146,712

(22) Filed: Jun. 7, 2005

(65) Prior Publication Data
US 2006/0065449 A1    Mar. 30, 2006

(30) Foreign Application Priority Data
Sep. 28, 2004   (JP)   ............................. 2004-281877

(51) Int. Cl.
*G01G 7/04* (2006.01)
(52) U.S. Cl. .............................. 177/210 EM; 177/212; 177/229
(58) Field of Classification Search ........ 177/210 EM, 177/212, 229
See application file for complete search history.

(56) References Cited

U.S. PATENT DOCUMENTS

| | | | | |
|---|---|---|---|---|
| 2,866,059 A | * | 12/1958 | Laimins | .......................... 338/5 |
| 4,143,727 A | * | 3/1979 | Jacobson | ..................... 177/211 |
| 4,338,825 A | * | 7/1982 | Amlani et al. | ......... 73/862.382 |
| 4,799,561 A | * | 1/1989 | Komoto | ....................... 177/229 |
| 5,866,854 A | | 2/1999 | Emery et al. | |
| 6,172,309 B1 | * | 1/2001 | Lockery | ..................... 177/211 |
| 6,378,379 B1 | | 4/2002 | Emery et al. | |

FOREIGN PATENT DOCUMENTS

| | | |
|---|---|---|
| JP | 2002-148105 | 5/2002 |
| JP | 2004-028750 | 1/2004 |

* cited by examiner

*Primary Examiner*—Randy W Gibson
(74) *Attorney, Agent, or Firm*—Rankin, Hill, Porter & Clark LLP

(57) ABSTRACT

Two horizontal holes are processed at the end face of a movable pillar of a load measuring cell in a block shape. A power-point spring is formed between the horizontal holes, and the internal side faces of the horizontal holes constitute the internal end faces of supporting-point springs. Further, from above or below the load measuring cell, a vertical hole is processed so that the supporting-point springs are separated by the vertical hole extending in a vertical direction and are formed on both side faces in the longitudinal direction of load measuring cell.

4 Claims, 5 Drawing Sheets

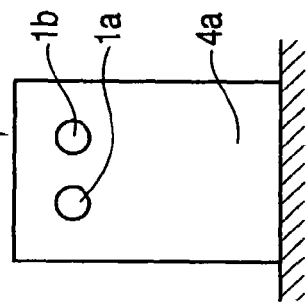
FIG. 1B
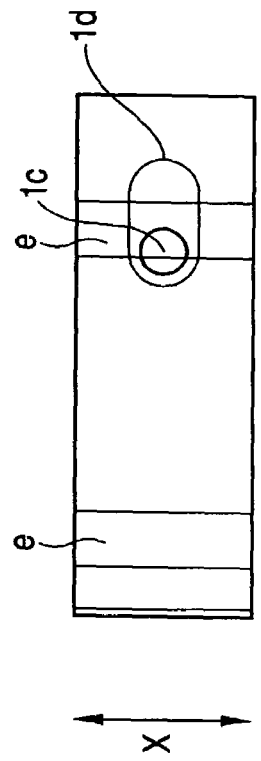
FIG. 1C
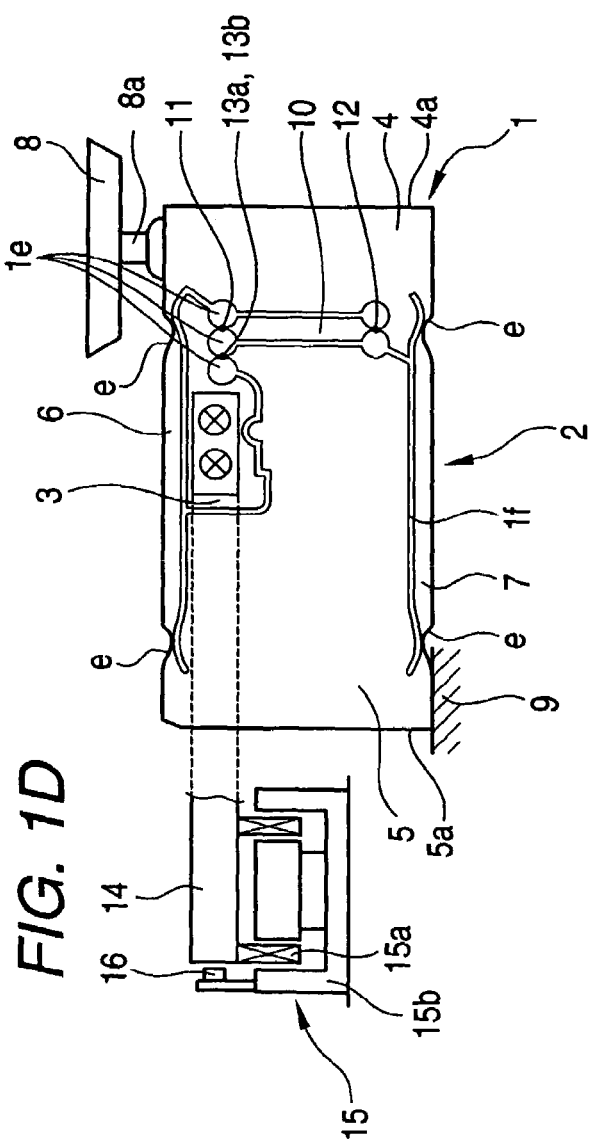
FIG. 1A
FIG. 1D

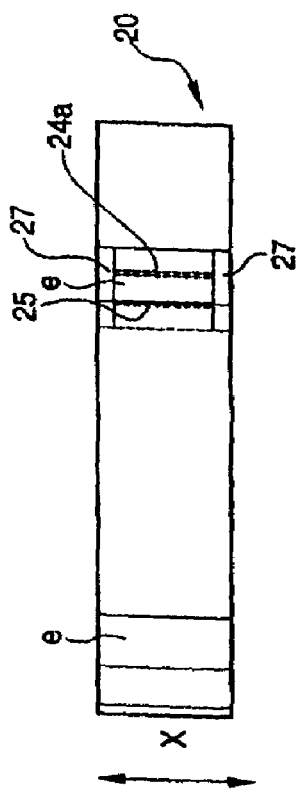
FIG. 3B
PRIOR ART
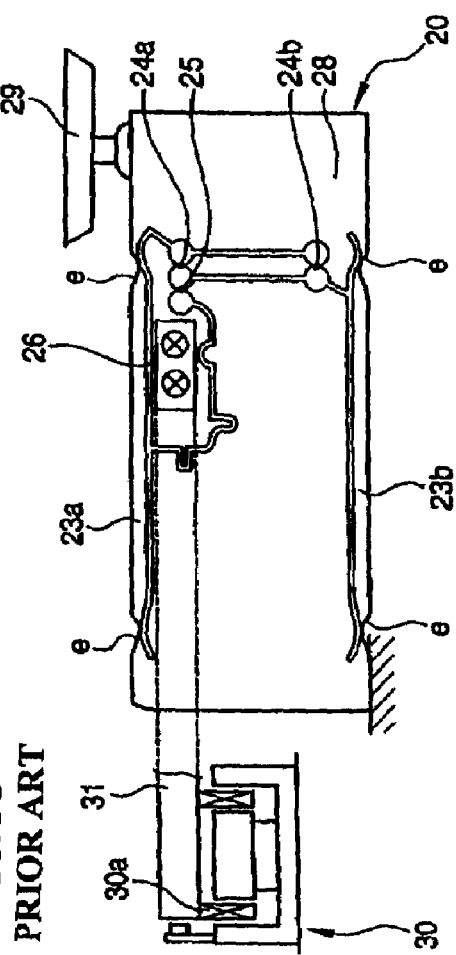
FIG. 3A
PRIOR ART
FIG. 3C
PRIOR ART

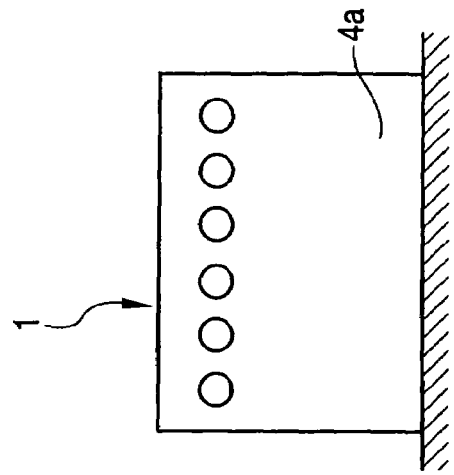
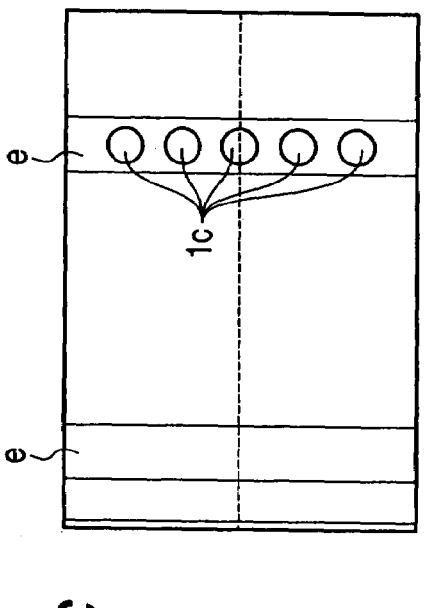
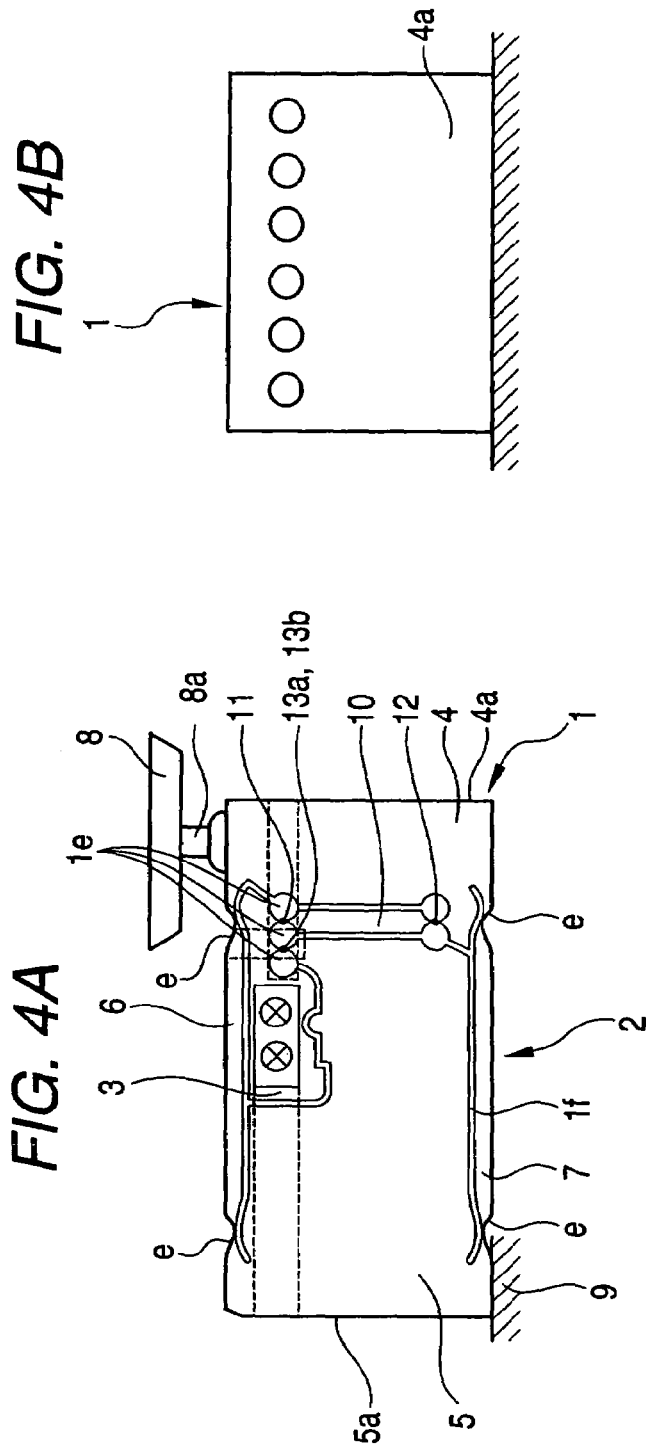

ELECTRONIC BALANCE HAVING A VIBRATION REDUCING MECHANISM

This application claims foreign priority based on Japanese Patent application No. 2004-281877, filed Sep. 28, 2004, the contents of which is incorporated herein by reference in its entirety.

BACKGROUND OF THE INVENTION

1. Field of the Invention

This invention relates to an electronic balance, and particularly to an electronic balance which is provided with a Roverbal mechanism (also called as a parallel guide), generates an electromagnetic force to eliminate displacement of a displaced portion due to a measuring load, and detects the measuring load from the generated electromagnetic force.

2. Description of the Related Art

In an electronic balance, generally, electromagnetic force is generated against the displacement of a sensor mechanism body due to measuring load, and the measuring load is measured on the basis of the electromagnetic force required for the displacement to be zero. As the sensor mechanism body in such electronic balance, a mechanism body provided with what is called a Roverbal mechanism is employed, in which a movable pillar supporting a measuring pan on which a measuring load is placed is supported on a fixed pillar by two beams parallel to each other each of which provided with flexible portions at both ends (refer to JP-A-2002-148105 and JP-A-2004-28750). The provision of the Roverbal mechanism prevents the measuring pan from tilting due to the measuring load, and restricts the displacement of the measuring pan or the movable pillar due to the measuring load in a vertical direction. Thus, the load detecting error due to the position of the measuring load placed on the measuring pan can be eliminated, thereby permitting the measurement with high accuracy.

FIG. 3A shows a side view of a load measuring cell 20 machined from a unit block which is employed as the above sensor mechanism body. FIG. 3B shows a top view thereof in which a measuring pan 29 is not shown. FIG. 3C shows a partial sectional view of an electromagnetic force generating device 30. As seen from these figures, the load measuring cell 20 forms, from a unit block shape, flexible portions e and beams 23a, 23b which configures a Roverbal mechanism two-dimensionally with wire electric discharge machining, and a lever block 26 which connects to power-point springs 24a, 24b and a supporting-point spring 25. Also, in the load measuring cell 20 as shown in FIG. 3B, widths in x-direction of the power-point springs 24a, 24b and the supporting-point spring 25 are narrowed by forming spot facings 27 on both side portions in a longitudinal direction of the load measuring cell 20. Thus the mechanical sensitivity is improved. As shown in FIG. 3A, the measuring pan 29 is fixedly attached to the upper end of a movable pillar 28 of the load measuring cell 20. A lever 31 with a force coil 30a of the electromagnetic force generating device 30 fixed at its one end is screwed on both sides of the lever block 26. This load measuring cell 20 has features such as that it can reduce the number of components and provide a high reproducibility of temperature characteristic.

The electronic balance in the related art is constructed as described above, but has the following problem. The lever block 26 is likely to vibrate according to the vibration in a width direction (or x-direction as shown in FIG. 3B) of the load measuring cell 20, i.e. in a direction perpendicular to the movable direction of the lever block 26. Accordingly, indicated value is varied for temporary vibration, and an error is generated continuously for steady vibration. Further, it was difficult to arrange the power point and the supporting point in their ideal shape, and implement the mechanical sensitivity in an optimum design.

SUMMARY OF THE INVENTION

This invention is accomplished in view of such a circumstance. An object of this invention is to provide an electronic balance in which the influence of vibration in the width direction of the load measuring cell is reduced.

In order to attain the above object, in accordance with this invention, an electronic balance has a block-shaped load measuring cell, the load measuring cell comprises a Roverbal mechanism for transmitting a measuring load in a vertical direction, a supporting-point spring for exerting the measuring load and a rotational moment of an electromagnetic force, and a movable pillar coupled with a power-point spring and a load receiver to which the measuring load is applied, wherein the load measuring cell is provided with at least two horizontal holes arranged in parallel at an end face of the movable pillar or an end face of a fixed pillar of the load measuring cell, so that a width of the power-point spring is controlled by a non-processed area between the horizontal holes and an internal side face of the horizontal holes constitutes an internal end face of the supporting-point spring, which means that the widths of the supporting-point springs 13a and 13b in x-direction are determined by the internal side faces 1a', 1b' of the horizontal holes 1a and 1b.

Further, in the electronic balance according to this invention, the load measuring cell is provided with at least one vertical hole extending from an upper or bottom face of the load measuring cell in a vertical direction so as to separate the supporting-point spring.

Further, in the electronic balance according to this invention, a spot facing is formed on a side portion in a longitudinal direction of the load measuring cell to decrease a width of the supporting-point spring.

Further, in the electronic balance according to this invention, the load measuring cell is provided with a plurality of the horizontal holes arranged in parallel at the end face of the movable pillar or the fixed pillar of the load measuring cell, so that at least one non-processed area in a parallel direction of the plurality of the horizontal holes controls the width of the power-point spring and at least one other non-processed area not controlling the power-point spring controls the width of the supporting-point spring.

The electronic balance according to this invention is constructed as described above, and can reduce influence of vibration in the thickness direction of the load measuring cell.

BRIEF DESCRIPTION OF THE DRAWINGS

FIG. 1A is a side view showing an embodiment of a load measuring cell 1 of the electronic balance according to this invention.

FIG. 1B is a front view thereof in which a measuring pan 8 and a pan receiving stand 8a are not shown.

FIG. 1C is a top view thereof in which the measuring pan 8 and the pan receiving stand 8a are not shown.

FIG. 1D is a partial sectional structural view of an electromagnetic force generating device 15.

FIG. 3A is a side view of a load measuring cell used in an electronic balance of the related art.

FIG. 3B is a top view thereof in which a measuring pan 29 is not shown.

FIG. 3C is a partial sectional structural view of the electromagnetic force generating device 30.

FIG. 4A is a side view showing an embodiment of a load measuring cell 1 of the electronic balance according to this invention.

FIG. 4B is a front view thereof according to another embodiment of this invention in which a measuring pan 8 and a pan receiving stand 8a are not shown.

FIG. 4C is a top view thereof according to another embodiment of this invention in which the measuring pan 8 and the pan receiving stand 8a are not shown.

DESCRIPTION OF THE PREFERRED EMBODIMENTS

Figure 2C:
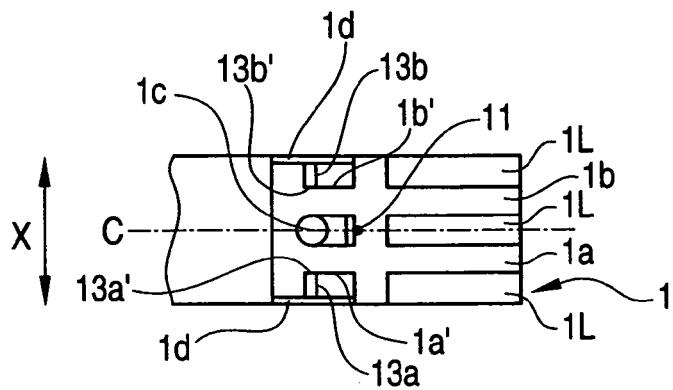
FIG. 2C is a sectional view taken in line A-A.

Now referring to the drawings, an explanation will be given of an embodiment of this invention.

Figure 2A:
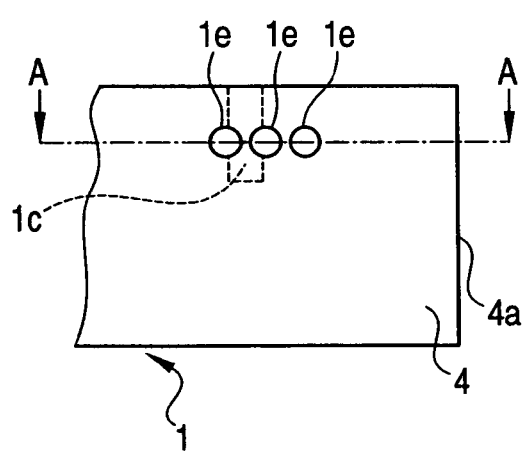
FIG. 2A is a partial side view showing positions of holes processed in the load measuring cell 1.
Figure 2B:
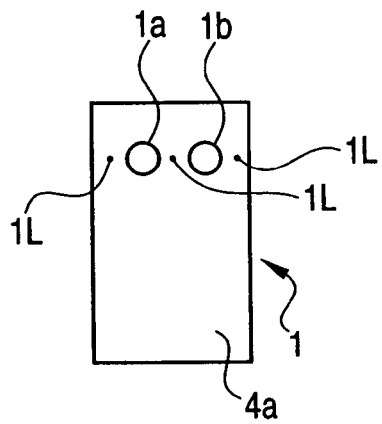
FIG. 2B is a front view thereof.
Figure 2D:
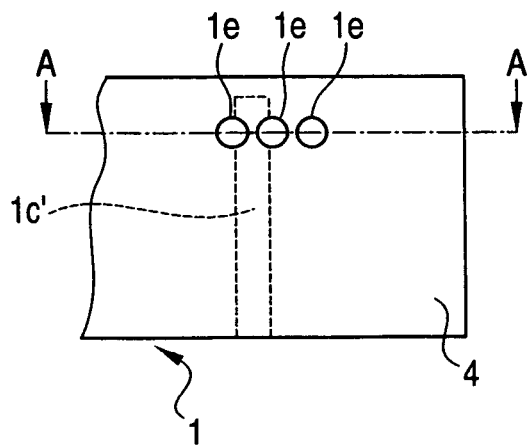
FIG. 2D is a partial side view showing another example of a vertical hole 1c' processed in the load measuring cell 1.
Figure 5B:
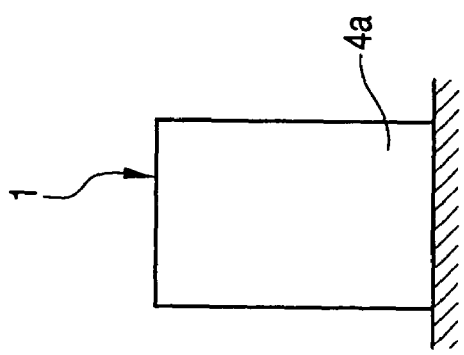
FIG. 5B is a front view thereof according to another embodiment of this invention in which a measuring pan 8 and a pan receiving stand 8a are not shown.
Figure 5C:
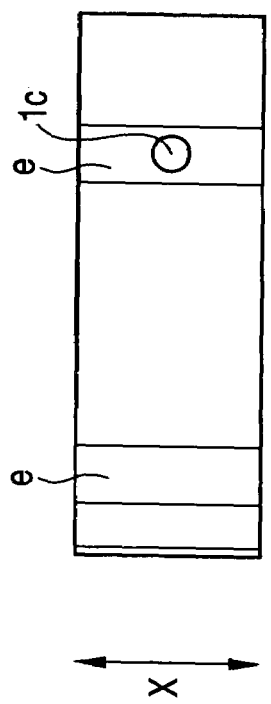
FIG. 5C is a top view thereof according to another embodiment of this invention in which the measuring pan 8 and the pan receiving stand 8a are not shown.
Figure 5A:
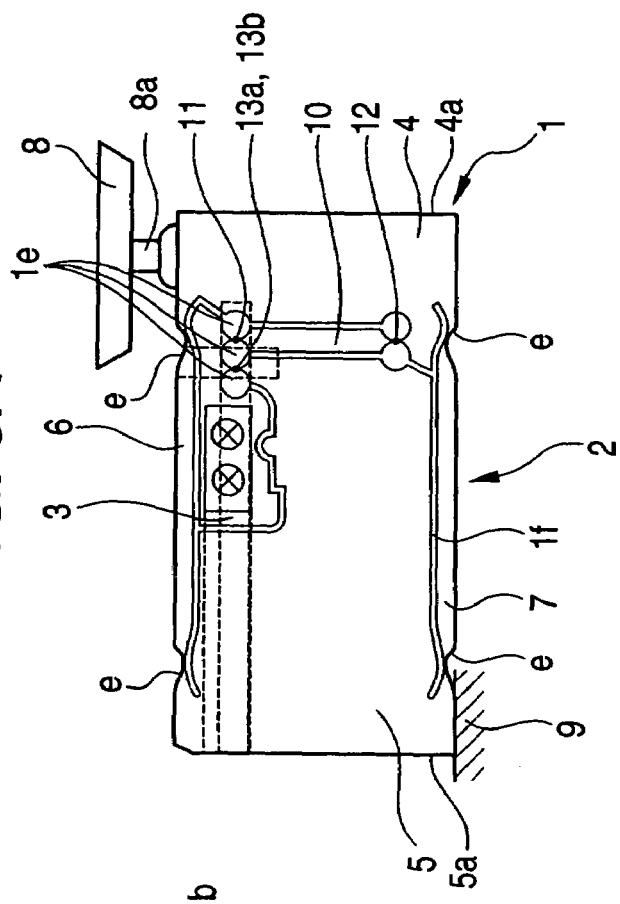
FIG. 5A is a side view showing an embodiment of a load measuring cell 1 of the electronic balance according to this invention.
Figure 5D:
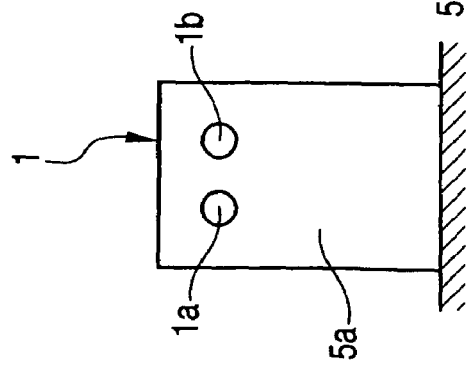
FIG. 5D is a back view thereof according to another embodiment of this invention.

FIG. 1A is a side view of a load measuring cell 1 in the case of applying the invention to an electronic balance. FIG. 1B is a front view thereof in which a measuring pan 8 and a pan receiving stand 8a are not shown. FIG. 1C is a top view thereof in which the measuring pan 8 and the pan receiving stand 8a are not shown, and in which a spot facing 1d is shown. FIG. 1D is a partial sectional structural view of an electromagnetic force generating device 15. FIG. 2A is a partial sectional view showing positions of holes processed in the load measuring cell 1. FIG. 2B is a front view thereof, and FIG. 2C is a sectional view taken in line A-A. This load measuring cell 1 forms the following various holes by drilling in a unit block made of aluminum alloy and the like. Also, the load measuring cell 1 forms a Roverbal mechanism 2 and a lever block 3 by providing a slit 1f through wire electric discharge machining.

The Roverbal mechanism 2 has a structure in which a movable pillar 4 and a fixed pillar 5 located at both ends of the unit block are connected with each other by upper and lower parallel beams 6, 7 which are provided with flexible portions e at both ends respectively. Onto the upper end face of the movable pillar 4, the measuring pan 8 is supported through the pan receiving stand 8a. A load receiver includes the measuring pan 8 and the pan receiving stand 8a. The lower end of the fixed pillar 5 is fixed to a balance base 9.

The movable pillar 4 is coupled with the one end of the lever block 3 through power-point springs 11, 12 formed at the upper and lower positions of a coupling segment 10. The lever block 3 is supported so as to be tiltable with two supporting-point springs 13a, 13b as its center which are formed at the right upper end (right side in the drawing) of the fixed pillar 5, which is at the movable pillar 4 side of the fixed pillar 5. At the other end of lever block 3, the base of a carrying-out member 14 is attached fixedly (the middle part thereof is not shown) which is configured of a separate member.

The base of the carrying-out member 14 is screwed at both side faces of the lever block 3 with fork-like branches. A force coil 15a of the electromagnetic force generating device 15 is fixed at the tip of the carrying-out member 14. The electromagnetic force generating device 15 has a structure in which the force coil 15a is movably arranged in a magnetostatic field generated by a magnetic circuit 15b.

Displacement of the tip of the carrying-out member 14 is detected by a displacement sensor 16. The current flowing through the force coil 15a is controlled by a servomechanism (not shown) so that the displacement of the carrying-out member 14 is zero constantly. Then the measuring load on the measuring pan 8 is measured on the basis of the current flowing through the force coil 15a.

The power-point spring 11 and the supporting-point springs 13a, 13b in the load measuring cell 1 according to this invention are formed by combining the following processes (1) to (3) as shown in FIG. 2.

(1) Two horizontal holes 1a, 1b, which are horizontally parallel and symmetrical about a center line c are formed in the end face 4a of the movable pillar 4 so as to cross horizontal holes 1e formed at three points of the side face of the unit block. The width (in x-direction as shown in FIG. 2C) of the power-point spring 11 is controlled or defined by non-processed areas 1L (three areas are shown in FIG. 2B) where the horizontal holes 1a, 1b are not formed. Thus, internal side faces 1a', 1b' of the horizontal holes 1a, 1b constitute internal end faces 13a', 13b' of the supporting-point springs 13a, 13b, which means that the widths of the supporting-point springs 13a and 13b in x-direction are determined by the internal side faces 1a', 1b' of the horizontal holes 1a and 1b. The non-processed areas 1L refer to the regions between the horizontal holes 1a, 1b and between each of the holes 1a, 1b and each of the side faces of the unit block. Ideally, two horizontal holes 1a, 1b are formed. This is because the object of this invention can be attained by the two holes, and the mechanical strength is not reduced as to such a small number of holes. Further, the number of man-hours and the production cost are reduced. However, in this invention, the number of the horizontal holes is not limited to two. Four horizontal holes may be formed so that the internal end faces of the supporting-point springs are defined by both outermost horizontal holes. Further, five or more horizontal holes rather than the four horizontal holes may be formed. By adjusting the size of each hole, any number of horizontal holes may be formed as required (see FIG. 4B). In this invention, the number of the vertical holes corresponds to the number of horizontal holes as shown in FIG. 4C.

A plurality of non-processed areas 1L (regions with no hole) is formed in the parallel direction of the horizontal holes according to the number of the horizontal holes. Thus, in another embodiment of this invention, one of the non-processed areas 1L (including the half of the non-processed areas 1L) may be used to define the width of the power-point spring, and at least one of the other non-processed areas 1L may be used to define the widths of the supporting-point springs. The number of the power-point spring and that of the supporting-point spring can be in various combinations; thus the restricting manner by the horizontal hole can be realized in various embodiments. This invention includes all of these embodiments.

In this invention, at least two horizontal holes which are horizontally parallel and symmetrical about a center line may be formed in the end face 5a of the fixed pillar 5 (see FIGS. 5A-5D).

(2) In order to separate the supporting-point springs 13a, 13b from each other, a vertical hole 1c is processed from the upper surface of the unit block in a vertical direction. Thus, the supporting-point springs 13a, 13b can be arranged on both side faces of the load measuring cell 1 in the longitudinal direction, and the single power point spring 11 can be formed at the center. The vertical hole may be processed from the bottom surface of the unit block in the vertical direction (see FIG. 2D).

(3) In order to reduce the width of the supporting-point springs 13a, 13b, spot facings 1d are provided on both side portions of the unit block in the longitudinal direction.

Accordingly, in the unified-block structure of the load measuring cell 1 processed from the unit block, interval between the supporting-point springs 13a, 13b can be broadened out as in an assembled electronic balance, thereby improving resistance to vibration. Further, the width of the power-point spring 11 can be narrowed to improve the mechanical sensitivity.

In accordance with the electronic balance of this invention, since a hole is processed in the end face of the movable pillar or the end face of the fixed pillar, and upper or lower side of the load measuring cell, interval between the two supporting-point springs is extended. Further, since the spot-facing is processed on the side portion in the longitudinal direction thereof, a width of the supporting-point spring is decreased. Further, a single power-point spring is formed. Accordingly, an optimum arrangement of the springs can be realized as in an assembled electronic balance, thereby increasing the distortion strength of the supporting-point springs against vibration in width direction. Further, the natural frequency of the lever system is increased so that processing of internal disturbance is facilitated, thereby improving vibration resistance of the electronic balance.

This invention relates to an electronic balance, and particularly to an electronic balance which is provided with a Roverbal mechanism, generates an electromagnetic force to eliminate displacement of a displaced portion due to a measuring load, and detects the measuring load from the generated electromagnetic force It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. An electronic balance having a block-shaped load measuring cell, said load measuring cell comprising:
   a Roverbal mechanism for transmitting a measuring load in a vertical direction;
   a supporting-point spring for exerting the measuring load and a rotational moment of an electromagnetic force; and
   a movable pillar coupled with a power-point spring and a load receiver to which the measuring load is applied, the power-point spring being coupled to the supporting-point spring,
   wherein said load measuring cell is provided with at least two horizontal holes arranged in parallel at an end face of the movable pillar or an end face of a fixed pillar of the load measuring cell, so that a width of the power-point spring is controlled by a non-processed area between the horizontal holes and an internal side face of the horizontal holes constitutes an internal end face of the supporting-point spring.

2. An electronic balance according to claim 1, wherein said load measuring cell is provided with at least one vertical hole extending from an upper or bottom face of the load measuring cell in a vertical direction so as to separate the supporting-point spring.

3. An electronic balance according to claim 1, wherein a spot facing is formed on a side portion in a longitudinal direction of the load measuring cell to decrease a width of the supporting-point spring.

4. An electronic balance according to claim 1, wherein said load measuring cell is provided with a plurality of the horizontal holes arranged in parallel at the end face of the movable pillar or the fixed pillar of the load measuring cell, so that at least one non-processed area in a parallel direction of said plurality of the horizontal holes controls the width of the power-point spring and at least one other non-processed area not controlling the power-point spring controls the width of the supporting-point spring.

* * * * *